United States Patent
Jasinschi et al.

(10) Patent No.: US 7,046,914 B2
(45) Date of Patent: May 16, 2006

(54) AUTOMATIC CONTENT ANALYSIS AND REPRESENTATION OF MULTIMEDIA PRESENTATIONS

(75) Inventors: Radu S. Jasinschi, Ossining, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1164 days.

(21) Appl. No.: 09/846,461

(22) Filed: May 1, 2001

(65) Prior Publication Data

US 2002/0164151 A1  Nov. 7, 2002

(51) Int. Cl.
*H04N 5/91* (2006.01)

(52) U.S. Cl. .................... 386/95; 386/386; 386/125

(58) Field of Classification Search ............... 386/46, 386/83, 95, 121, 52, 96
See application file for complete search history.

(56) References Cited

U.S. PATENT DOCUMENTS

| | | | | |
|---|---|---|---|---|
| 5,136,655 A | | 8/1992 | Bronson | ............ 381/41 |
| 5,546,191 A | * | 8/1996 | Hibi et al. | ............ 386/83 |
| 5,550,966 A | | 8/1996 | Drake et al. | ............ 395/154 |
| 5,576,950 A | * | 11/1996 | Tonomura et al. | ......... 386/121 |
| 5,646,796 A | * | 7/1997 | Kimura et al. | ............ 360/72.2 |
| 5,655,117 A | | 8/1997 | Goldberg et al. | |
| 5,684,715 A | | 11/1997 | Palmer | |
| 5,821,945 A | | 10/1998 | Yeo et al. | ............ 345/440 |
| 6,882,793 B1 | * | 4/2005 | Fu et al. | ............ 386/95 |
| 6,901,207 B1 | * | 5/2005 | Watkins | ............ 386/83 |

FOREIGN PATENT DOCUMENTS

| | | |
|---|---|---|
| WO | 9722145 | 12/1997 |
| WO | 9903028 | 2/1999 |

* cited by examiner

*Primary Examiner*—Huy Nguyen (57) ABSTRACT

For use in a multimedia analysis system capable of analyzing the content of multimedia signals, there is disclosed an apparatus and method for creating a multimedia table of contents of videotaped material. In one advantageous embodiment, the apparatus of the present invention comprises a multimedia table of contents controller that is capable of receiving video signals, audio signals, and text signals of said videotaped material, and capable of combining portions of the video signals, audio signals, and text signals to create a table of contents of the videotaped material. The controller is capable of segmenting video signals with both a coarse and fine segmentation application. The controller is also capable of locating boundaries of elements of the videotaped material with both a coarse and fine boundary detection application. An index module of the controller links elements of the table of contents with combinations of audio, visual, and transcript cues. A retrieval module retrieves and displays a table of contents in response to a user request.

20 Claims, 6 Drawing Sheets

AUTOMATIC CONTENT ANALYSIS AND REPRESENTATION OF MULTIMEDIA PRESENTATIONS

CROSS-REFERENCES TO RELATED APPLICATIONS

The present invention is related to the invention disclosed in U.S. patent application Ser. No. 09/006,657 filed on Jan. 13, 1998 by N. Dimitrova et al. entitled "Multimedia Computer System with Story Segmentation Capability and Operating Program Therefor Including Finite Automaton Video Parser" and to the invention disclosed in U.S. patent application Ser. No. 09/442,960 filed on Nov. 18, 1999 by N. Dimitrova entitled "Method and Apparatus for Audio/Data/Visual Information Selection" and to the invention disclosed in U.S. patent application Ser. No. [Disclosure Number 701168] filed on Mar. 9, 2001 by R. Jasinschi entitled "Context and Content Based Information Processing for Multimedia Segmentation and Indexing." The related patent applications are commonly assigned to the assignee of the present invention. The disclosures of the related patent applications are hereby incorporated by reference in the present patent application as if fully set forth herein.

TECHNICAL FIELD OF THE INVENTION

The present invention is directed, in general, to automatic content analysis of multimedia presentations, more specifically, to a system and method that creates a table of contents and an index for videotaped multimedia presentations.

BACKGROUND OF THE INVENTION

A wide variety of video recorders are available in the marketplace. Most people own, or are familiar with, a video cassette recorder (VCR), also referred to as a video tape recorder (VTR). A video cassette recorder records video programs on magnetic cassette tapes. More recently, video recorders have appeared in the market that use computer magnetic hard disks rather than magnetic cassette tapes to store video programs. For example, the ReplayTV™ recorder and the TiVO™ recorder digitally record television programs on hard disk drives using, for example, an MPEG video compression standard. Additionally, some video recorders may record on a readable/writable, digital versatile disk (DVD) rather than a magnetic disk.

The widespread use of video recorders has generated and continues to generate large volumes of videotaped materials. Because a video recorder captures both video signals and audio signals, videotaped materials are multimedia materials. A number of different types of automatic computerized systems and methods have been developed for analyzing, indexing, and retrieving videotaped multimedia materials.

The automatic computerized systems and methods that exist for analyzing videotaped multimedia materials are generally capable of identifying segments of a video program that contain topics identified by a user. The desired segments are usually identified based upon search keywords that the user provides to the system.

An automatic computerized multimedia retrieval system that allows users to identify and select portions of videotaped multimedia materials usually meets three requirements. First, a system and method is usually available for parsing a video signal into its video, audio, and text components. Second, a system and method is usually available for analyzing the content of the video, audio, and text components of the videotaped multimedia signal with respect to user input criteria and segmenting the components based on content. Third, a system and method is usually available for integrating and storing program segments that match the user's search criteria.

A system that meets these requirements is described in U.S. patent application Ser. No. 09/006,657 filed Jan. 13, 1998 by Dimitrova et al. entitled "Multimedia Computer System with Story Segmentation Capability and Operating Program Therefor Including Finite Automaton Video Parser." U.S. patent application Ser. No. 09/006,657 is hereby incorporated herein by reference within this document for all purposes as if fully set forth herein.

U.S. patent application Ser. No. 09/006,657 describes a system and method that provides a set of models for recognizing a sequence of symbols, a matching model that identifies desired selection criteria, and a methodology for selecting and retrieving one or more video story segments or sequences based upon the selection criteria.

Another system that meets these requirements is described in U.S. patent application Ser. No. 09/442,960 filed Nov. 18, 1999 by Dimitrova et al. entitled "Method and Apparatus for Audio/Data/Visual Information Selection." U.S. patent application Ser. No. 09/442,960 is hereby incorporated herein by reference within this document for all purposes as if fully set forth herein.

There is a need for an improved system and method for automatically analyzing the content of videotaped multimedia presentations. In particular, there is a need for an improved system and method for creating a table of contents of a videotaped multimedia presentation.

SUMMARY OF THE INVENTION

It is an object of the present invention to provide an improved system and method for automatically analyzing the content of videotaped multimedia presentations.

It is also an object of the present invention to provide an improved system and method for creating a table of contents of a videotaped multimedia presentation.

In one advantageous embodiment, the apparatus of the present invention comprises a multimedia table of contents controller that is capable of receiving video signals, audio signals, and text signals of said videotaped material. The multimedia table of contents controller combines portions of the video signals, audio signals, and text signals to create a table of contents of the videotaped material. The multimedia table of contents controller segments video signals first with a coarse segmentation process and then with a fine segmentation process.

The multimedia table of contents controller is also capable of locating boundaries of elements of the videotaped material. The multimedia table of contents controller first uses a coarse boundary detection process and then a fine boundary detection process. The multimedia table of contents controller comprises an index module that links elements of the table of contents with combinations of audio, visual, and transcript cues. The multimedia table of contents controller also comprises a retrieval module that retrieves and displays a table of contents in response to a user request.

It is also an object of the present invention to provide an improved system and method for creating a general multimedia index of a videotaped multimedia presentation.

It is also an object of the present invention to provide an improved system and method for creating a specific topical multimedia index of a videotaped multimedia presentation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a multimedia processor. Those skilled in the art will recognize that the exemplary embodiment of the present invention may easily be modified for use in other types of systems for analyzing multimedia signals.

Figure 1:
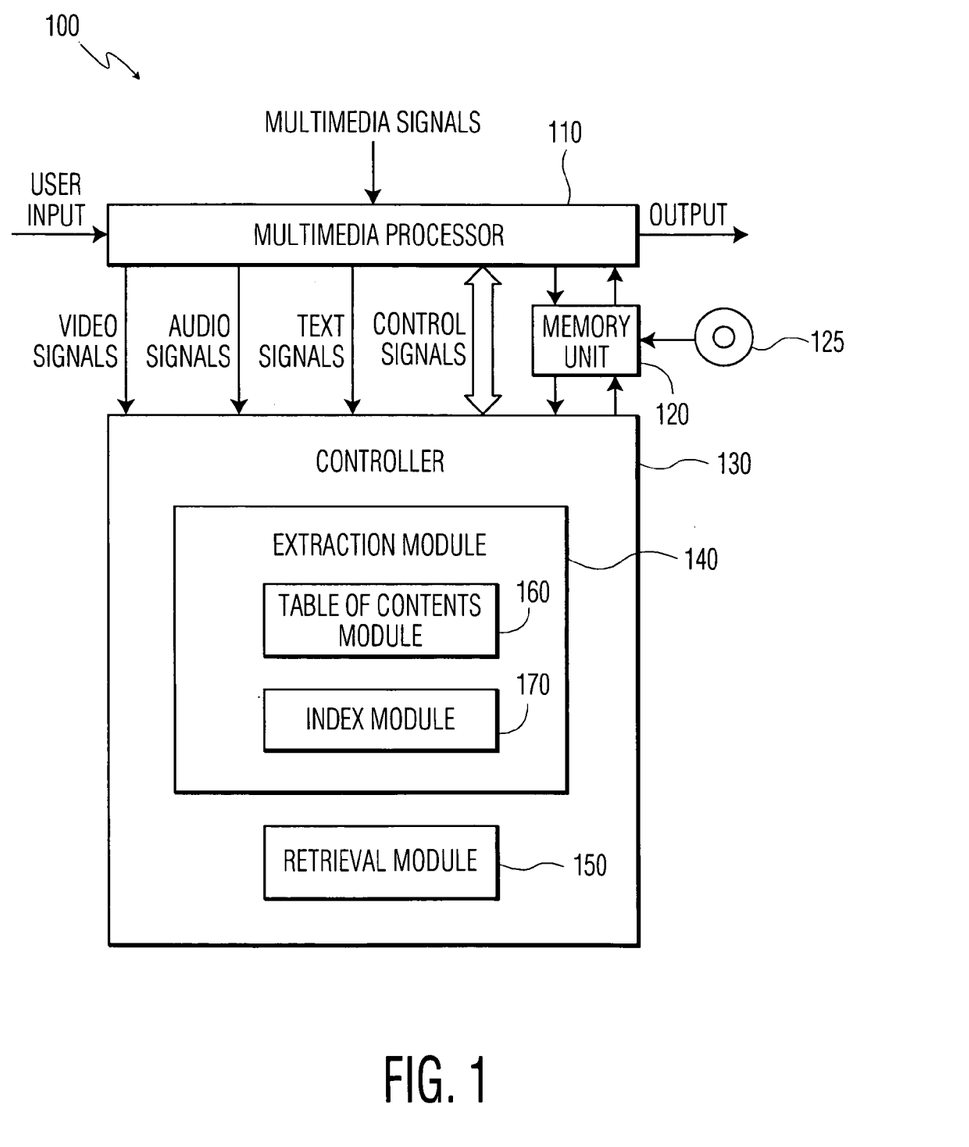
FIG. 1 illustrates a block diagram of an exemplary multimedia analysis system comprising an advantageous embodiment of the present invention.

FIG. 1 illustrates a block diagram of an exemplary multimedia analysis system 100 for analyzing videotaped multimedia signals. Multimedia analysis system 100 comprises multimedia processor 110. Multimedia processor 110 receives videotaped multimedia signals and parses them into video, audio, and text components. Multimedia processor 110 analyzes the content of the video, audio, text components of the videotaped multimedia signal and identifies and segments the components based on content. Multimedia processor 110 stores the signal components and signal segments in memory unit 120. In one advantageous embodiment, multimedia processor 110 may comprise the multimedia processor described in U.S. patent application Ser. No. 09/006,657. In another advantageous embodiment, multimedia processor 110 may comprise the multimedia processor described in U.S. patent application Ser. No. 09/442,960.

Memory unit 120 may comprise random access memory (RAM) or a combination of random access memory (RAM) and read only memory (ROM). Memory unit 120 may comprise a non-volatile random access memory (RAM), such as flash memory. Memory unit 120 may comprise a mass storage data device, such as a hard disk drive (not shown). Memory unit 120 may also comprise an attached peripheral drive or removable disk drive (whether embedded or attached) that reads read/write DVDs or re-writable CD-ROMs. As illustrated in FIG. 1, removable disk drives of this type are capable of receiving and reading re-writable CD-ROM disk 125.

Multimedia processor 110 provides the video signals, audio signals, and text signals that are the components of the videotaped multimedia material to controller 130 of the present invention. Controller 130 is capable of receiving control signals from multimedia processor 110 and sending control signals to multimedia processor 110. Controller 130 is also coupled to multimedia processor 110 through memory unit 120. As will be more fully described, controller 130 is capable of creating a table of contents from the video signals, audio signals, and text signals received from multimedia processor 110. Controller 130 stores the table of contents in memory unit 120. Multimedia processor 110, in response to a user request, accesses the table of contents stored in memory unit 120 and outputs the table of contents to a display (not shown) that is viewed by the user.

Controller 130 creates a table of contents that displays information that summarizes the content of the videotaped multimedia material. The table of contents generally comprises a combination of video signals, audio signals, and text signals. The table of contents is capable of displaying (1) text, and (2) still video images comprising a single video frame, and (3) moving video images (referred to as a video "clip" or a video "segment") comprising a series of video frames, and (4) text transcribed from audio signals, and (5) any combination thereof.

As shown in FIG. 1, controller 130 comprises extraction module 140 and retrieval module 150. Extraction module 140 comprises table of contents module 160 and index module 170. As will be more fully described, table of contents module 160 ("TOC" module 160) analyzes the content of the videotaped multimedia material. TOC module 160 identifies topics in the videotaped multimedia material. TOC module 160 generates a table of contents for the topics that it identifies in the videotaped multimedia material. Index module 170 creates links to the different video segments that make up the table of contents. Index module 170 also creates links to the different subsegments that make up the video segments in the table of contents.

Retrieval module 150, in response to a user request received through multimedia processor 110, accesses those elements in the table of contents that match the user request. When a match is found, retrieval module 150 identifies the appropriate table of contents to multimedia processor 110. Multimedia processor 110 then outputs the table of contents to a display (not shown) for the user.

Figure 2:
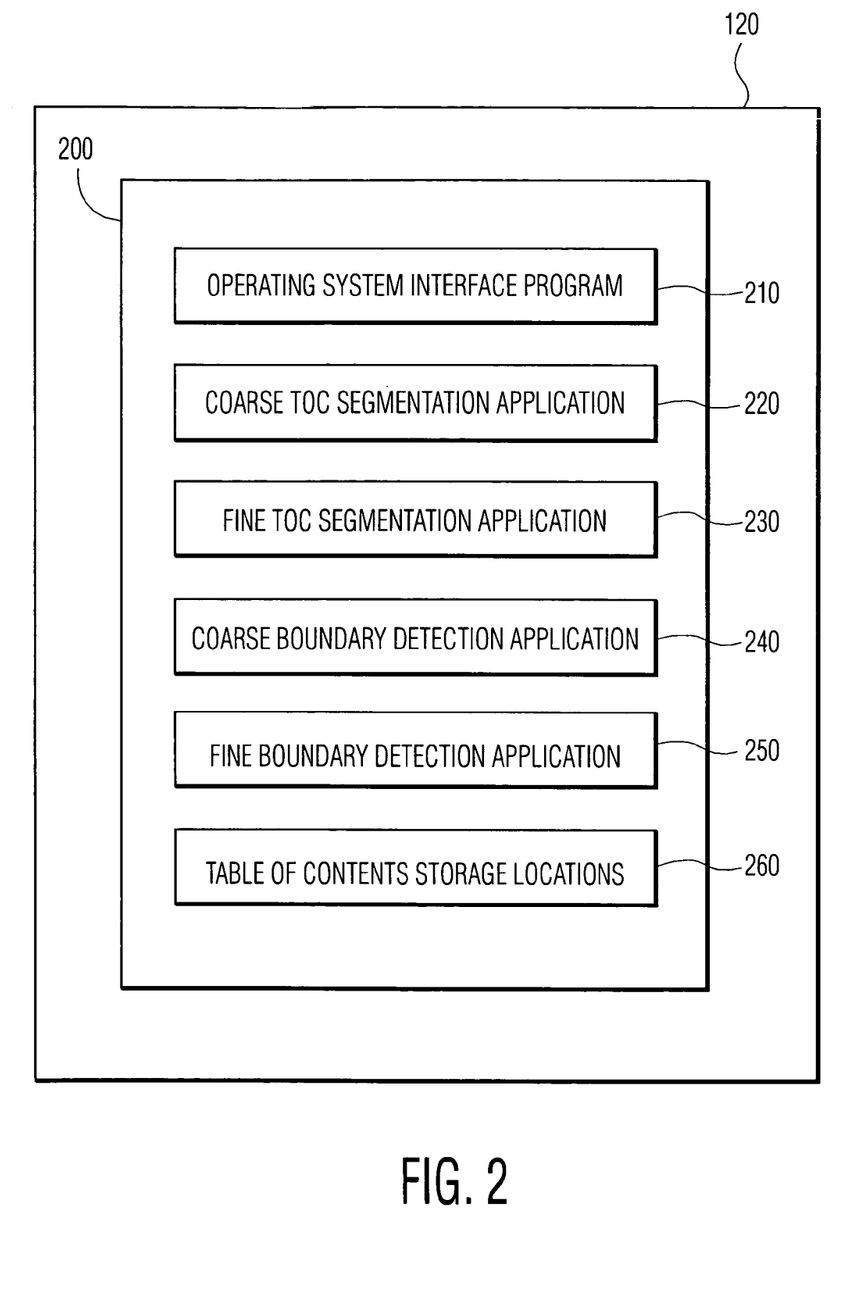
FIG. 2 illustrates computer software that may be used with an advantageous embodiment of the present invention.

Controller 130 must identify the appropriate video images to be used to create a multimedia table of contents. An advantageous embodiment of the present invention comprises computer software 200 capable of identifying the appropriate video images to be used to create a table of contents for the videotaped multimedia material. FIG. 2 illustrates a selected portion of memory unit 120 that contains computer software 200 of the present invention. Memory unit 120 contains operating system interface program 210, coarse table of contents ("TOC") segmentation application 220, fine table of contents ("TOC") segmentation application 230, coarse video boundary detection application 240, fine video boundary detection application 250, and table of contents storage locations 260.

Controller 130 and computer software 200 together comprise a multimedia table of contents controller that is capable of carrying out the present invention. Under the direction of instructions in computer software 200 stored within memory unit 120, controller 130 creates a table of contents for the videotaped multimedia material, stores the table of contents in table of contents storage locations 260, and replays the stored table of contents at the request of the user. Operating system interface program 210 coordinates the operation of computer software 200 with the operating system of controller 130.

To create a table of contents, the multimedia table of contents controller of the present invention (comprising controller 130 and software 200) first segments the video signal of the videotaped multimedia material. The video portion of the multimedia signal is assumed to be the main source of information for creating the table of contents.

To illustrate the operation of controller 130 and software 200, assume that the videotaped multimedia material comprises a videotaped lecture presentation accompanied by slides. A typical lecture presentation with slides usually includes (1) a title page slide that states the name of the presentation, the authors, and their affiliation, and (2) a summary page slide that generally states the main elements of the presentation (this is not a detailed table of contents), and (3) an introduction page slide that states the motivation, method, and results of the work, and (4) a method page slide that describes in detail the methods employed, and (5) a results page slide that describes the results of applying the methods, and (6) a summary page slide that states the conclusions of the authors.

Videotaped material of a lecture will generally depict (1) views of the lecturer speaking, and (2) the slides, and (3) static (i.e., non-moving) images, such as a single video frame, and (4) video clips, and (5) audio clips, and (6) video clips showing the audience. Therefore, the information presented is multimodal. That is, the information is presented in the visual domain, and in the audio domain, and in the textual (i.e., transcript) domain. Unlike mainstream broadcast television programs, lecture presentations generally do not carry close-captioned (CC) text. Therefore, the transcript of the audio portions of the lecture (e.g., speech) must be obtained using speech-to-text conversion techniques. To do this, the audio information is passed through a speech recognition process. The output of the speech recognition process is then fed to a speech-to-text conversion process.

Controller 130 first executes the coarse table of contents segmentation application 220 of software 200 to segment the video signal. This will provide (1) video sequences showing the lecturer in typical head-and-shoulder views, and (2) the presentation slides, and (3) static images, and (4) explanatory video clips, and (5) video sequences showing the audience. The presentation slides and the static images contain no dynamic information except for artifacts due to signal noise. The explanatory video clips are video sequences that are part of the presentation. The lecturer uses the explanatory video clips to illustrate or explain a slide or topic that is being presented.

The coarse table of contents segmentation application 220 of software 200 operates in four stages. In the first stage, the presentation slides are segmented. The slides are shown in video sequences containing visual text superimposed on dark background. The title of the slide, which normally appears at the top of the slide, determines the overall content of the slide. The visual text of the slide is processed using an optical character recognition (OCR) system in order to determine the textual character content. For example, the character content of the title may be used as an element in the table of contents. The slide segmentation process is also applied to all video sequences that show the presentation slides.

In the second stage, the video sequences that show the lecturer's face are segmented. These video sequences typically show the lecturer at the center of the video image plane. The image of the lecturer must be segmented from the background. In some cases, the presentation slides may be used as the background. Face detection and/or face recognition techniques are used to segment the image of the lecturer.

In the third stage, the static images are segmented. The static images differ from the presentation slide images in that the static images generally do not contain text characters. In some cases, the static images do contain text characters, but not necessarily in the format that the text appears in the presentation slide images.

In the fourth stage, the video clips that are a part of the lecture presentation ("lecture video clips") are segmented. The lecture video clips can be segmented by comparing them to the video sequences of the presentation slides, to the head-and-shoulder views of the lecturer, and to the static images.

In an alternate advantageous embodiment of the present invention, an additional fifth stage of the coarse table of contents segmentation may also be performed. In the fifth stage, "combination" images are segmented. A "combination" image is an image that contains more than one type of image. For example, one type of combination image comprises a static image in which a video clip is superimposed on a portion of the static image. A second type of combination image comprises a video clip in which a static image is superimposed on a portion of the video clip. A third type of combination image comprises a video clip in which a presentation slide is superimposed on a portion of the video clip. Other types of combination images are also possible. If no combination images are present, then the fifth stage of the coarse table of contents segmentation is not necessary.

The entries in the table of contents of the present invention comprise individual descriptive elements such as video images, text, audio excerpts, etc. In order to obtain an accurate table of contents, the present invention must have accurate information concerning the "begin" times and the "end" times for the various entries in the table of contents. That is, the boundaries of the various entries in the table of contents must be accurately determined.

In particular, after the four stages of the coarse table of contents segmentation have been performed, the video boundaries between the four sets of images must be accurately determined. That is, the video boundaries between the presentation slides, the head-and-shoulder views of the lecturer, the static images, and the lecture video clips, must be accurately located.

To accomplish this task, controller 130 executes coarse boundary detection application 240 of software 200. Coarse boundary detection application 240 comprises a number of techniques for locating video boundaries. For examples of such techniques, refer to U.S. patent application Ser. No. [Disclosure Number 701168] by Radu S. Jasinschi entitled "Context and Content Based Information Processing for Multimedia Segmentation and Indexing" filed Mar. 9, 2001. In the first boundary detection technique, boundary detection is accomplished using audio and video signals. This technique employs individual visual cut points and audio cut points. The visual cut points are obtained after cut detection. The audio cut points are obtained by using (1) simple thresholds of audio levels, or (2) audio segmentation and categorization into categories of speech, silence, music, noise, and combinations of these categories. A simple combination may be done based on co-occurrence of time codes of audio cuts and visual cuts within a time window. A more elaborate integration may be performed using the probabilistic framework for multimodal integration described in U.S. patent application Ser. No. [Disclosure Number 701168] referred to above.

In the second boundary detection technique, boundary detection is accomplished using transcript information. This technique employs individual sentences from a transcript and audio and visual cuts. Sentences are isolated from the transcript based on the punctuation marks that occur at the end of the sentences (e.g., period, exclamation point, question mark). Time codes for the beginning and the end of sentences are matched to the closest audio cut or closest visual cut. To determine the "begin" time, the smaller audio cut or visual cut is taken. To determine the "end" time, the closest smaller (or equal) audio silence point is taken.

In the third boundary detection technique, boundary detection is accomplished using transcript information and audio and visual cuts. There are various techniques known in the art for identifying the boundaries of individual paragraphs. For example, refer to an article entitled "Text Tiling: Segmenting Text Into Multi-Paragraph Subtopic Passages" by M. Hearst in Computational Linguistics, Volume 23(1), pages 33–64, 1997. For text paragraphs, the "begin" and "end" times are extracted. The "begin" time is matched with the earlier audio cut. If an earlier visual cut exists within a specified range (e.g., five (5) seconds) then the "begin" time is adjusted to the respective cut. The "end" time of the transcript is matched with the next (greater) audio cut (silence). If a visual cut follows soon after, we can take the time code of the visual cut as the "end" time.

In the fourth boundary detection technique, boundary detection may be accomplished using audio continuity (from audio segments) aided by macrolevel visual continuity (from visual segments) and topic continuity. In this technique, a large macrolevel segment is called a "mega-segment" and its smaller component segments are called "constituent segments." For example, consider the case of audio continuity judged from the categories of consecutive, interspersed audio segments. If the two particular audio categories are represented by speech segments and silence segments ("constituent segments"), then at a macrolevel the two particular categories may be integrated into a single "mega-segment" for continuity. Similarly, if the two particular audio categories are represented by speaker A and by speaker B ("constituent segments"), then at a macrolevel the conversation of speaker A and speaker B may be integrated into a single "mega-segment" for continuity.

If the visual shots that correspond to a "mega-segment" exhibit similar continuity (e.g., they have the same color scheme and they form a group of shots that are similar), then the "mega-segment" is marked as a story segment. If the visual shots show multiple groups of shots, then the larger "mega-segment" may be broken down into multiple segments to correspond the multiple visual aspects.

For music segments (e.g., in a lecture on the history of music), the whole detected audio music segment is marked as a story segment with in "begin" and "end" times. This should correspond to several minutes worth of music segment without silence. In music videos, for example, songs can be separated by silence. So each segment in between two silence segments is a "story" segment (i.e., a music segment).

In the fifth boundary detection technique, boundary detection is accomplished using video continuity aided by audio continuity and topic continuity. Visual continuity within a time limit (e.g., five (5) minutes or a specified fraction of the program) is judged based on shot similarity of each shot with the following "n" shots. The value of "n" must be greater than one (1) so that consecutive shots are not compared. The shot similarity could be based on histograms, objects (e.g., size of faces), scene composition, texture composition, or a combination of these categories. For example, a few shots of an apartment indoors could be followed by shots of an urban outdoor scene. The indoor shots would have a particular histogram (e.g., warmer colors), scene composition, and texture. The outdoor shots would have a histogram with more gray colors and more straight edges (e.g., buildings). A larger story segment derived from visual continuity can be broken down using the audio categories or topic segmentation from the transcript.

In each of the boundary detection techniques described above, meta-level heuristics can be employed depending upon the type of content that is being segmented (i.e., context information). Similarly, in the visual aspects, if two similar scenes are interspersed (i.e., person A followed by person B followed by person A), then the individual shots are integrated into a single "story."

Coarse boundary detection application 240 determines the video boundaries between the four elements (i.e., presentation slides, the head-and-shoulder views of the lecturer, the static images, and the video clips). Then the intervals between the boundaries of the four elements are indexed with (1) the type of element, and (2) for the slides, the title text.

Controller 130 then executes the fine table of contents segmentation application 230 of software 200 to segment each of the four elements identified above. The fine table of contents segmentation application 230 uses techniques similar to those described for the coarse table of contents segmentation application 220. Then controller 130 executes the fine boundary detection application 250 for each of the four elements to locate any boundaries within each of the four elements that were identified during the execution of the fine table of contents segmentation application 230.

Controller 130 then accesses index module 170 to link the different entries that have been selected for the table of contents. In particular, index module 170 links selected video segments (e.g., views of the lecturer, static images, presentation slides, lecture video clips), selected text and the time code of the occurrence of the selected text, and selected audio entries. Index module 170 also links the combinations of audio, visual and transcript cues. Index module 170 processes the audio signal to obtain audio cues such as speech, music, silence, noise, etc.

Index module 170 also performs a speech recognition process. Lecture presentations generally contain "speech" audio information (i.e., the lecturer's voice). Sometimes music is added to the lecture presentation, either as background music or as part of the presentation (e.g., in an audio clip or in a video clip). The output of the speech recognition process performed by index module is used as input to a speech-to-text process. The speech-to-text process provides a text of the speech in the form of a transcript. The text can be used as an input to a natural language processing (NLP) process in order to determine syntactic and semantic textual content information.

The transcript of text contains a more extensive description of the text presented in the presentation slides. For example, the lecturer can initially read the presentation slide text and then make additional comments on it. The lecturer's additional comments may include topical relationships, inferences, etc. The text of the lecturer's speech is therefore much more extensive than the presentation slide text. The presentation slide text presents a summary or "guide" to the lecturer's presentation.

After index module 170 has completed its operations, controller 130 stores the resulting table of contents in a table of contents storage location 260 in memory unit 120. Retrieval module 150 is capable of retrieving a table of contents that is stored in memory unit 120 and causing the retrieved table of contents to be displayed in the manner previously described.

Figure 3:
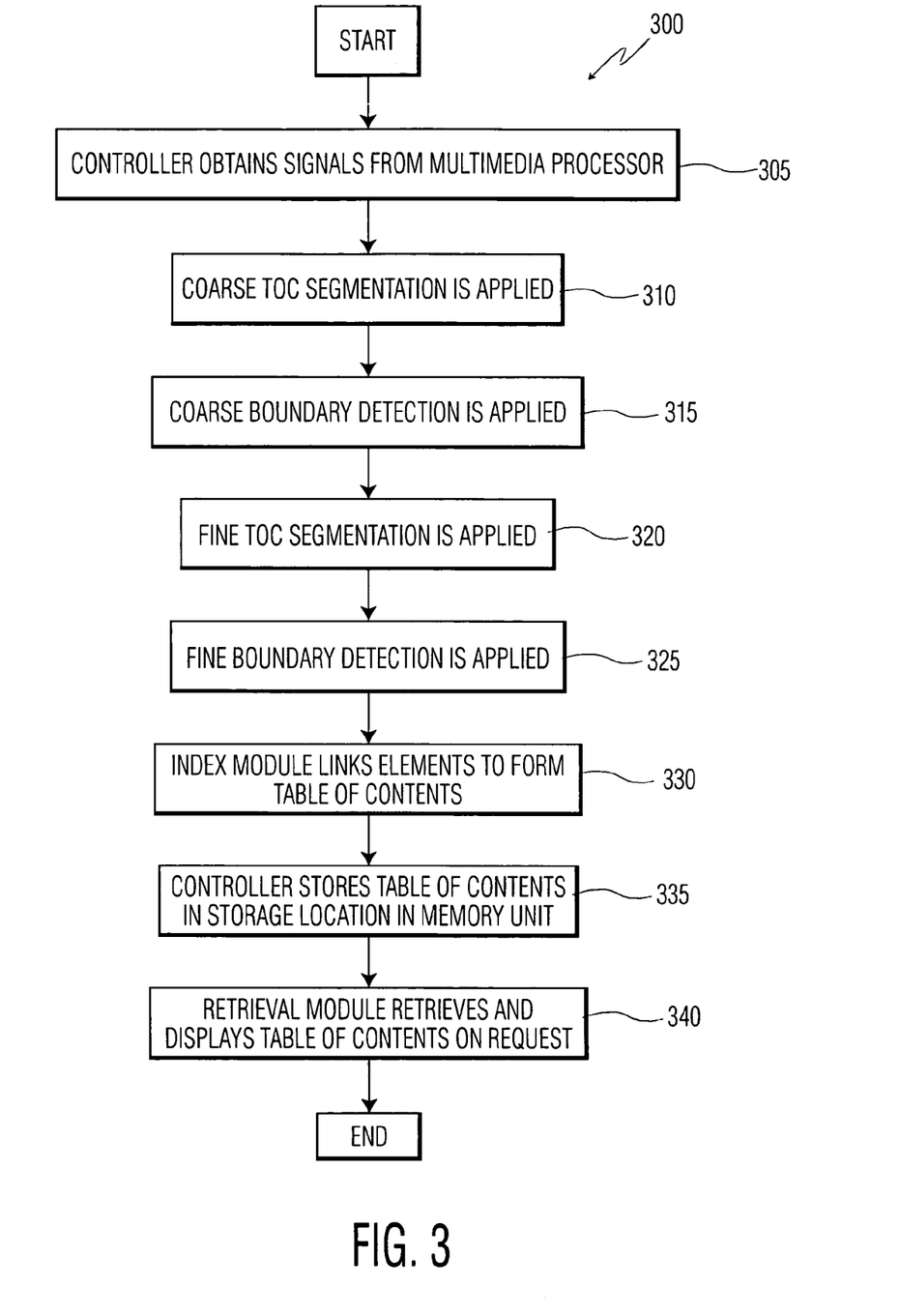
FIG. 3 illustrates a flow diagram showing an advantageous embodiment of a method of the present invention for creating a table of contents of a videotaped multimedia presentation.

FIG. 3 illustrates a flow diagram showing an advantageous embodiment of the method of the present invention for creating a table of contents of a videotaped multimedia presentation. The steps of the method are collectively referred to with the reference numeral 300. Controller 130 obtains video signals, audio signals, and text signals from multimedia processor 110 (step 305). Controller 130 then executes coarse table of contents segmentation application 220 to segment the video signals (step 310). Controller 130 then executes coarse boundary detection application 240 to locate the boundaries between the four elements (i.e. between the presentation slides, the head-and-shoulder views of the lecturer, the static images, and the video clips) (step 315).

Controller 130 then executes fine table of contents segmentation application 230 to further segment each of the four elements (step 320). Controller 130 then executes fine boundary detection application 250 to locate boundaries within each of the four elements (step 325). Index module 170 then links various elements (i.e., selected video segments, selected text and the time code of the occurrence of the selected text, and selected audio entries) to form a table of contents (step 330). Controller 130 then stores the table of contents in a table of contents storage location 260 within memory unit 120 (step 335). When requested by a user, retrieval module 150 retrieves a table of contents from memory unit 120 and causes it to be displayed (step 340).

Figure 4:
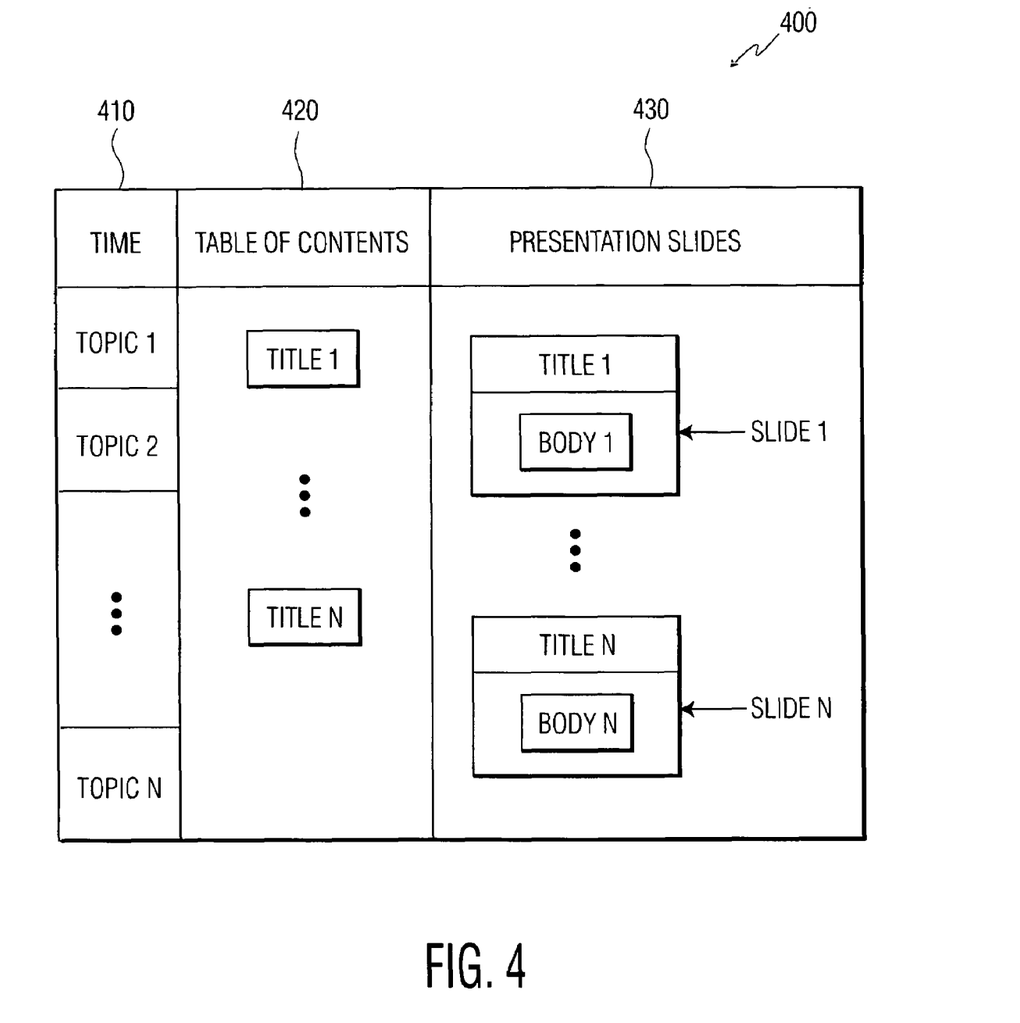
FIG. 4 illustrates one exemplary embodiment of a multimedia table of contents that can be created by an advantageous embodiment of the present invention.

FIG. 4 illustrates an exemplary table of contents 400 created by an advantageous embodiment of the multimedia analysis system of the present invention. FIG. 4 illustrates a typical structure of a table of contents 400. Column 410 of table of contents 400 displays a time line that sequentially lists the topics discussed in the lecture (topic 1, topic 2, . . . , topic N) in the order in which the topics appear: Table of contents column 420 displays the titles of each of the presentation slides (title 1, . . . , title N). Presentation slide column 430 displays images of the presentation slides (slide 1, . . . , slide N) The title and body of each presentation slide is displayed.

The present invention has been described with reference to an apparatus and method for creating a multimedia table of contents of a videotaped multimedia presentation. However, the present invention also comprises an apparatus and method for creating a multimedia index of a videotaped multimedia presentation.

The table of contents and the multimedia index both contain summarized information concerning the videotaped multimedia presentation. However, the structure and function of the table of contents and the multimedia index differ in significant ways. The table of contents provides a general overview or "roadmap" of the presentation. A user can use the table of contents to learn (1) the location of each of the topics and subtopics of the presentation, and (2) the general content of the topics and subtopics of the presentation.

A multimedia index, on the other hand, identifies the location of very specific items that are mentioned in the presentation. The items that may appear in a multimedia index include, without limitation, the names of individuals, the names of places, the names of concepts, abbreviations and definitions of words, acronyms, historical references, references to publications, citations to reference works, etc. A multimedia index typically lists each page on which the indexed item is mentioned. In addition, a multimedia index may contain still video images, video clips, and audio clips that relate to the index entries.

A multimedia index provides access to detailed topics for in depth retrieval capability. In particular, a keyword may be used to search a multimedia index to locate every instance where the keyword appears in the presentation.

In addition to creating a generalized multimedia index, the apparatus and method of the present invention are capable of creating a special multimedia index. A special multimedia index comprises a list of index references that relate to a specific topic. For example, a special multimedia index may comprise a list of publications (i.e., a multimedia bibliography) that are mentioned in the videotaped multimedia presentation. The multimedia bibliography may also contain still video images, video clips, and audio clips that relate to the entries in the multimedia bibliography.

For an additional example, a special multimedia index may comprise a multimedia glossary for distinctive words that appear in the videotaped multimedia presentation. The multimedia glossary may also contain still video images, video clips, and audio clips that relate to the entries in the multimedia glossary. Other types of special multimedia indexes may also be created.

Figure 5:
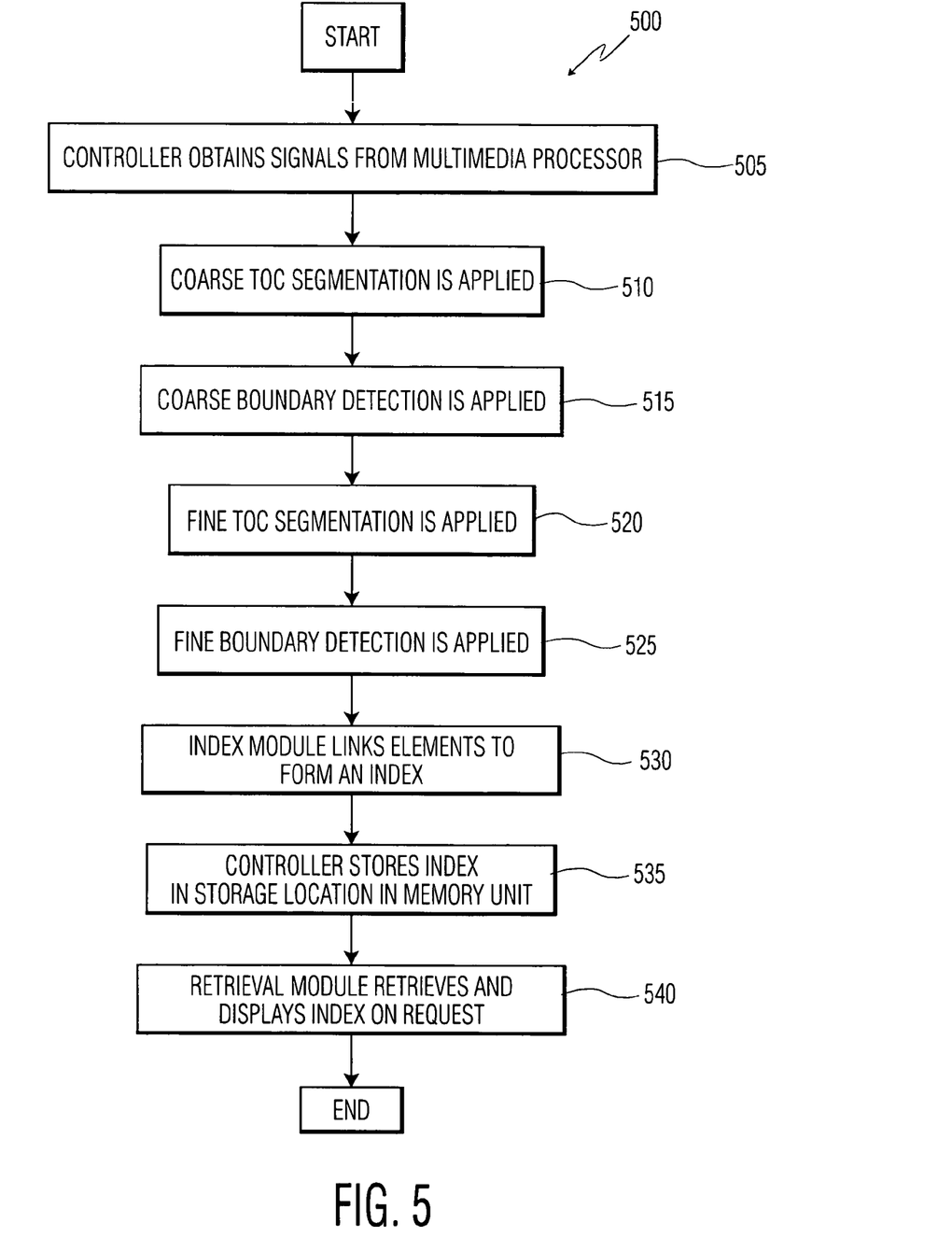
FIG. 5 illustrates a flow diagram showing an advantageous embodiment of a method of the present invention for creating a multimedia index of a videotaped multimedia presentation.

FIG. 5 illustrates a flow diagram showing an advantageous embodiment of the method of the present invention for creating a multimedia index of a videotaped multimedia presentation. The steps of the method are collectively referred to with the reference numeral 500. Controller 130 obtains video signals, audio signals, and text signals from multimedia processor 110 (step 505). Controller 130 then executes coarse table of contents segmentation application 220 to segment the video signals (step 510). Controller 130 then executes coarse boundary detection application 240 to locate the boundaries between the four elements (i.e. between the presentation slides, the head-and-shoulder views of the lecturer, the static images, and the video clips) (step 515).

Controller 130 then executes fine table of contents segmentation application 230 to further segment each of the four elements (step 520). Controller 130 then executes fine boundary detection application 250 to locate boundaries within each of the four elements (step 525). Index module 170 then links various elements (i.e., selected video segments, selected text and the time code of the occurrence of the selected text, and selected audio entries) to form a multimedia index (step 530). Controller 130 then stores the multimedia index in a table of contents storage location 260 within memory unit 120 (step 535). When requested by a user, retrieval module 150 retrieves a multimedia index from memory unit 120 and causes it to be displayed (step 340).

Figure 6:
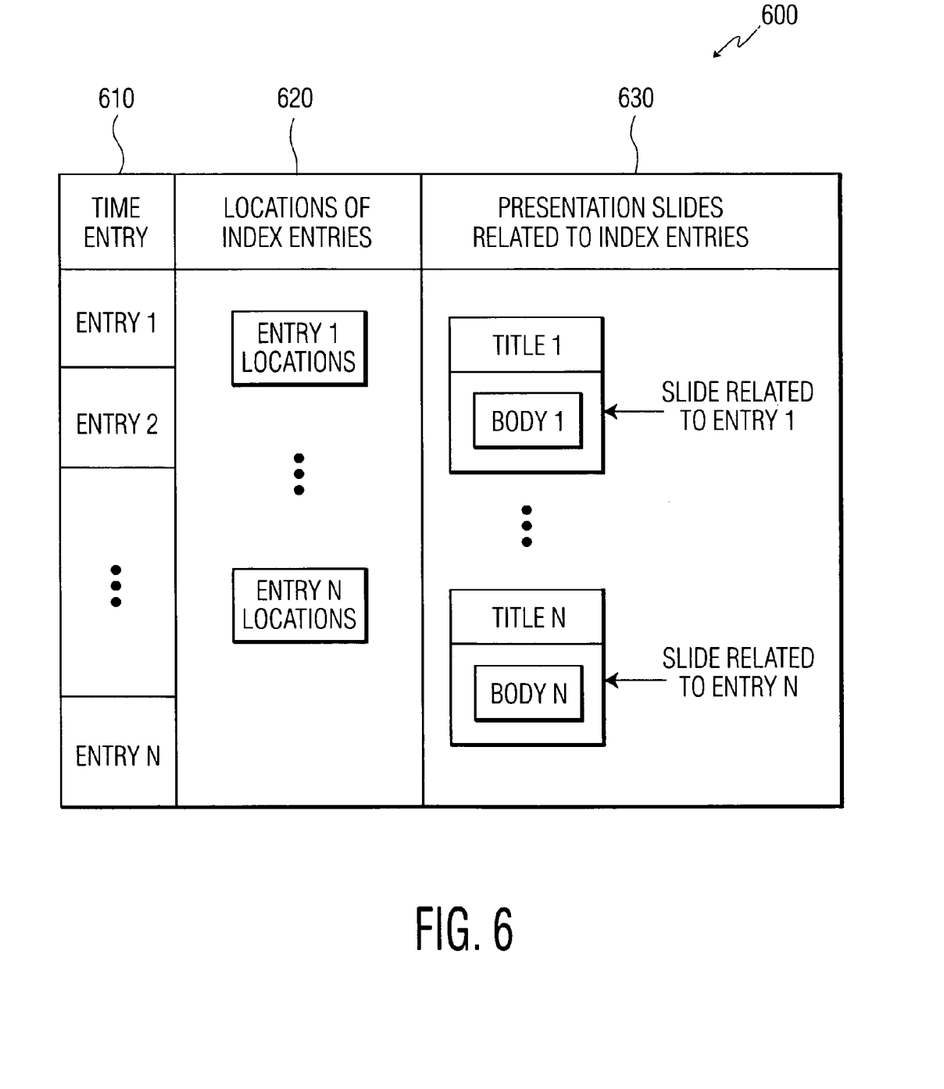
FIG. 6 illustrates one exemplary embodiment of a multimedia index that can be created by an advantageous embodiment of the present invention.

FIG. 6 illustrates an exemplary multimedia index 600 created by an advantageous embodiment of the multimedia analysis system of the present invention. FIG. 6 illustrates a typical structure of a multimedia index 600. Column 610 of multimedia index 600 displays a list of the index entries that are discussed in the lecture (entry 1, entry 2, . . . , entry N). In one advantageous embodiment, the index entries are listed in alphabetical order. In an alternate advantageous embodiment, the index entries are located in groups where each group relates to a topic that is discussed in the lecture. Column 620 of multimedia index 600 displays the locations within the lecture where each of the index entries is mentioned during the course of the lecture (entry 1 locations, . . . , entry N locations). Column 630 of multimedia index 600 displays images of presentation slides that relate to the index entries (slide relating to entry 1, . . . , slide relating to entry N).

The present invention has been described as a system and method for use with multimedia analysis system 100 comprising multimedia processor 110. Multimedia analysis system 100 may be located within a number of different types of multimedia communications equipment. For example, multimedia analysis system 100 may be located, without limitation, within a television receiver, or within a set top box for use with a television receiver, or within an Internet appliance that is capable of receiving multimedia signals from the Internet.

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. For use in a multimedia analysis system capable of analyzing content of multimedia signals, an apparatus for creating a multimedia table of contents of videotaped material, said apparatus comprising:

a multimedia table of contents controller capable of:

receiving video signals, audio signals, and text signals of said videotaped material;

combining portions of said video signals, audio signals, and text signals of said videotaped material to create a table of contents of said videotaped material;

creating said table of contents of said videotaped material by selecting a video segment that relates to an element of said videotaped material, and by adding said video segment to said table of contents of said videotaped material; and executing computer software instructions contained within a memory unit coupled to said controller:

to create said table of contents of said videotaped material by segmenting a video signal of said videotaped material into elements using a coarse table of contents segmentation application, and by locating video boundaries of said elements of said videotaped material using a coarse boundary detection application; and to create said table of contents of said videotaped material by segmenting said video signal of said videotaped material into said elements using a fine table of contents segmentation application, and by locating said video boundaries of said elements of said videotaped material using a fine boundary detection application.

2. The apparatus as claimed in claim 1, wherein said controller further comprises:

an index module capable of linking said elements of said videotaped material selected f or said table of contents, and capable of linking said elements with combinations of audio, visual, and transcript cues.

3. The apparatus as claimed in claim 2 wherein said controller further comprises:

a retrieval module capable of retrieving a table of contents stored in said memory unit and causing said table of contents to be displayed in response to a user request.

4. The apparatus as claimed in claim 1 wherein said multimedia table of contents controller is capable of combining portions of said video signals, audio signals, and text signals of said videotaped material to create a multimedia index of said videotaped material.

5. The apparatus as claimed in claim 4 wherein said multimedia index of said videotaped material comprises one of: a specialized topical multimedia index, a multimedia bibliography, and a multimedia glossary.

6. A multimedia analysis system capable of analyzing content of multimedia signals, said multimedia analysis system comprising an apparatus for creating a multimedia table of contents of videotaped material, said apparatus comprising:

a multimedia table of contents controller capable of:

receiving video signals, audio signals, and text signals of said videotaped material;

combining portions of said video signals, audio signals, and text signals of said videotaped material to create a table of contents of said videotaped material;

creating said table of contents of said videotaped material by selecting a video segment that relates to an element of said videotaped material, and by adding said video segment to said table of contents of said videotaped material; and executing computer software instructions contained within a memory unit coupled to said controller:
  to create said table of contents of said videotaped material by segmenting a video signal of said videotaped material into elements using a coarse table of contents segmentation application, and by locating video boundaries of said elements of said videotaped material using a coarse boundary detection application; and
  to create said table of contents of said videotaped material by segmenting said video signal of said videotaped material into said elements using a fine table of contents segmentation application, and by locating said video boundaries of said elements of said videotaped material using a fine boundary detection application.

7. The multimedia analysis system as claimed in claim 6, wherein said controller further comprises:
  an index module capable of linking said elements of said videotaped material selected for said table of contents, and capable of linking said elements with combinations of audio, visual, and transcript cues.

8. The multimedia analysis system as claimed in claim 7 wherein said controller further comprises:
  a retrieval module capable of retrieving a table of contents stored in said memory unit and causing said table of contents to be displayed in response to a user request.

9. The multimedia analysis system as claimed in claim 6 wherein said multimedia table of contents controller is capable of combining portions of said video signals, audio signals, and text signals of said videotaped material to create a multimedia index of said videotaped material.

10. The multimedia analysis system as claimed in claim 9 wherein said multimedia index of said videotaped material comprises one of: a specialized topical multimedia index, a multimedia bibliography, and a multimedia glossary.

11. For use in a multimedia analysis system capable of analyzing content of multimedia signals, a method for creating a multimedia table of contents of videotaped material, said method comprising the steps of:
  receiving in a multimedia table of contents controller video signals, audio signals, and text signals of said videotaped material;
  combining portions of said video signals, audio signals, and text signals of said videotaped material in said multimedia table of contents controller to create said multimedia table of contents;
  wherein the step of combining portions of said video signals, audio signals, and text signals of said videotaped material in said multimedia table of contents controller to create said multimedia table of contents comprises the steps of:
    selecting a video segment that relates to an element of said videotaped material; and
    adding said video segment to said table of contents of said videotaped material;
  receiving in said multimedia table of contents controller instructions from computer software stored in a memory unit coupled to said multimedia table of contents controller;
  executing said instructions in said multimedia table of contents controller to segment a video signal of said videotaped material into elements using a coarse table of contents segmentation application;
  executing said instructions in said multimedia table of contents controller to locate video boundaries of said elements of said videotaped material using a coarse boundary detection application;
  executing said instructions in said multimedia table of contents controller to segment said video signal of said videotaped material into said elements using a fine table of contents segmentation application; and
  executing said instructions in said multimedia table of contents controller to locate said video boundaries of said elements of said videotaped material using a fine boundary detection application.

12. The method as claimed in claim 11, further comprising the steps of:
  linking said elements of said videotaped material selected for said table of contents using an index module; and
  linking said elements of said videotaped material with combinations of audio, visual, and transcript cues using said index module.

13. The method as claimed in claim 12 further comprising the steps of:
  retrieving a table of contents stored in said memory unit in response to a user request using a retrieval module; and
  causing said table of contents to be displayed.

14. The method as claimed in claim 11 further comprising the step of:
  combining portions of said video signals, audio signals, and text signals of said videotaped material in said multimedia table of contents controller to create a multimedia index.

15. The method as claimed in claim 14 wherein said multimedia index comprises one of: a specialized multimedia index, a multimedia bibliography, and a multimedia glossary.

16. For use in a multimedia analysis system capable of analyzing content of multimedia signals, computer-executable instructions stored on a computer-readable storage medium for creating a multimedia table of contents of videotaped material, the computer-executable instructions comprising the steps of:
  receiving in a multimedia table of contents controller video signals, audio signals, and text signals of said videotaped material;
  combining portions of said video signals, audio signals, and text signals of said videotaped material in said multimedia table of contents controller to create said multimedia table of contents;
  wherein the step of combining portions of said video signals, audio signals, and text signals of said videotaped material in said multimedia table of contents controller to create said multimedia table of contents comprises the steps of:
    selecting a video segment that relates to an element of said videotaped material; and
    adding said video segment to said table of contents of said videotaped material;
  receiving in said multimedia table of contents controller instructions from computer software stored in a memory unit coupled to said multimedia table of contents controller;
  executing said instructions in said multimedia table of contents controller to segment a video signal of said videotaped material into elements using a coarse table of contents segmentation application; and executing said instructions in said multimedia table of contents controller to locate video boundaries of said elements of said videotaped material using a coarse boundary detection application;

executing said instructions in said multimedia table of contents controller to segment said video signal of said videotaped material into said elements using a fine table of contents segmentation application; and executing said instructions in said multimedia table of contents controller to locate said video boundaries of said elements of said videotaped material using a fine boundary detection application.

17. The computer-executable instructions stored on a computer-readable storage medium as claimed in claim 16, further comprising the steps of:

linking said elements of said videotaped material selected for said table of contents using an index module; and linking said elements of said videotaped material with combinations of audio, visual, and transcript cues using said index module.

18. The computer-executable instructions stored on a computer-readable storage medium as claimed in claim 17 further comprising the steps of:

retrieving a table of contents stored in said memory unit in response to a user request using a retrieval module; and causing said table of contents to be displayed.

19. The computer-executable instructions stored on a computer-readable storage medium as claimed in claim 16 further comprising the step of:

combining portions of said video signals, audio signals, and text signals of said videotaped material in said multimedia table of contents controller to create a multimedia index.

20. The computer-executable instructions stored on a computer-readable storage medium as claimed in claim 19 wherein said multimedia index comprises one of: a specialized multimedia index, a multimedia bibliography, and a multimedia glossary.

* * * * *